United States Patent [19]

Miller et al.

[11] Patent Number: 4,979,842
[45] Date of Patent: Dec. 25, 1990

[54] HYDRAULICALLY ACTUATABLE SHRINKING DISC, PARTICULARLY FOR FORCE TRANSMITTING CONNECTION OF A HUB WITH A SHAFT

[75] Inventors: Wolfgang Miller, Wetter-Wengern; Udo Schafer, Witten-Bommern, both of Fed. Rep. of Germany

[73] Assignee: Tas Schäfer GmbH Technik Für Antrieb Und Steuerung, Wetter-Wengern, Fed. Rep. of Germany

[21] Appl. No.: 381,091

[22] Filed: Jul. 17, 1989

Related U.S. Application Data

[63] Continuation-in-part of Ser. No. 269,952, Nov. 10, 1988, abandoned.

[30] Foreign Application Priority Data

Nov. 11, 1987 [DE]   Fed. Rep. of Germany ....... 3738138

[51] Int. Cl.$^5$ ............................ F16B 1/00; F16D 1/00
[52] U.S. Cl. ......................................... 403/15; 403/37
[58] Field of Search ..................... 403/15, 37

[56] References Cited

U.S. PATENT DOCUMENTS 2,764,437  9/1956  Bratt ....................... 403/15
4,425,050  1/1984  Durand ................... 403/15
4,702,635  10/1987  Muellenberg ........... 403/15

FOREIGN PATENT DOCUMENTS 267269  9/1970  U.S.S.R. ................... 403/15

Primary Examiner—Andrew V. Kundrat
Attorney, Agent, or Firm—Michael J. Striker

[57]     ABSTRACT

A hydraulically actuatable shrinking disc, especially for a force transmitting connection of a hub having a cylindrical outer surface with a shaft comprises an inner ring arranged to be located on a cylindrical outer surface of a hub and having a double-conical outer peripheral surface, two pressure rings which are arranged axially opposite to one another in a displaceable and clampable manner on the inner ring and have inner conical surfaces which corresponds to the outer peripheral surface of the inner ring, the pressure rings forming therebetween a pressure chamber for a pressure fluid, the pressure rings being mirror-symmetrical in their cross-section and each formed with a cylindrical outer peripheral surface, the pressure rings being provided with openings which serve as pressure medium passages, a clamping ring which serves as an abutment for the pressure rings and surrounds the latter, the clamping ring having an outer peripheral surface which is provided with a connecting opening for the pressure fluid and subdivided into two pressure medium passages which form an obtuse angle relative to a radial plane and extend inside the clamping ring so as to open at an inner peripheral surface of the clamping ring, the pressure medium passages of the pressure rings extend from the inner peripheral surface to the outer peripheral surface of the pressure ring and form relative to a radial plane an angle which is opposite to the angle between the pressure medium passages of the clamping ring, the pressure medium passages of the pressure rings open at the outer peripheral surface of the pressure rings and the pressure medium passages of the clamping ring open at the inner peripheral surface of the clamping ring so as to communicate with one another, and so that the pressure medium passages of the pressure rings supply the pressure fluid to the inner and outer peripheral surfaces of the pressure rings and through the latter into the pressure chamber.

13 Claims, 2 Drawing Sheets

HYDRAULICALLY ACTUATABLE SHRINKING DISC, PARTICULARLY FOR FORCE TRANSMITTING CONNECTION OF A HUB WITH A SHAFT

CROSS REFERENCE TO A RELATED APPLICATION

This application is a continuation-in-part of patent application Ser. No. 269,952, filed on Nov. 10, 1988, now abandoned.

BACKGROUND OF THE INVENTION

The present invention relates to a hydraulically actuatable shrinking disc, particularly for a force transmitting connection of a hub with a shaft.

In particular it relates to such a shrinking disc which has an inner ring arranged on a cylindrical peripheral surface of a hub to be tensioned, and two axially opposite pressure rings which are axially displaceable and tensionable on the inner ring and have inner peripheral surfaces which correspond to a double conical outer peripheral surface of the inner ring, and also form therebetween a pressure chamber for pressure fluid.

Shrinking discs of the above mentioned general type are known in the art. One of such shrinking discs is disclosed for example in the U.S. Pat. No. 4,425,050, FIGS. 1 and 2. In this shrinking disc a ring shaped shoulder located outside of both pressure rings serves for forming the pressure chamber. This shoulder is formed on one of the pressure rings and overlaps a partial region of the cylindrical outer surface of the other pressure ring. The pressure ring which is provided with the ring shaped shoulder has a conduit which supplies the pressure medium directly into the pressure chamber. Because of the non-uniform design of the pressure ring and the special ring shaped shoulder, the production of the known shrinking disc is relatively expensive. Moreover, the sealing of the pressure chamber in the region of the ring shaped shoulder pauses some problems. Furthermore, it is not precluded that the pressure rings which cooperate with the conical surfaces of the inner ring clamp on these surfaces, whereby the tensioning of the shrinking disc is made difficult.

SUMMARY OF THE INVENTION

Accordingly, it is an object of the present invention to provide a shrinking disc of the above mentioned general type which avoids the disadvantages of the prior art.

More particularly, it is an object of the present invention to provide a hydraulically actuatable shrinking disc which has a construction which is simple for performing the mounting function and in which hydraulic tensioning of the pressure ring can be achieved easy and uniformly with a high degree of safety for the force transmitting connection.

In keeping with these objects and with others which will become apparent hereinafter, one feature of the present invention resides, briefly stated, in a shrinking disc in which the pressure rings are formed mirror-symmetrical in their cross-section and provided with a cylindrical outer peripheral surface, the pressure rings have openings which serve as pressure medium passages and are guided inside a clamping ring which is formed as an abutment, a connecting opening for the pressure fluid is provided on the outer peripheral surface of the clamping ring, and the connecting opening is subdivided inside the clamping ring into two pressure medium passages which extend at an obtuse angle relative to a radial plane inside the clamping ring and open on the inner peripheral surface of the clamping disc, the pressure medium passages of the pressure rings extend from the inner peripheral surface of the outer peripheral surface of the pressure ring and form an angle relative to a radial plane such that it is located opposite to the angle formed by the passages in the clamping ring, the openings of the pressure medium passages on the outer peripheral surface of the pressure rings coincide with the openings of the pressure medium passages on the inner peripheral surface of the clamping ring, and the pressure medium passages supply the pressure fluid to the inner and outer peripheral surfaces of the pressure rings and through them into the pressure chamber.

When the shrinking disc is designed in accordance with the present invention, it has a compact construction and a short tensioning path of both pressure rings. Furthermore, all individual parts of the shrinking disc are worked in a simple manner and assembled during their mounting by the clamping ring. Moreover, it is advantageous that all opposite surfaces during the supply of the pressure medium (hydraulic coil) are simultaneously lubricated so that a clamping of the pressure ring is reliably prevented and the shrinking disc always operates with a full tensioning force. Therefore the applied hydraulic pressure is always directly proportional to the radial tensioning force with which the shrinking disc is pressed on the hub.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENT

Figure 1:
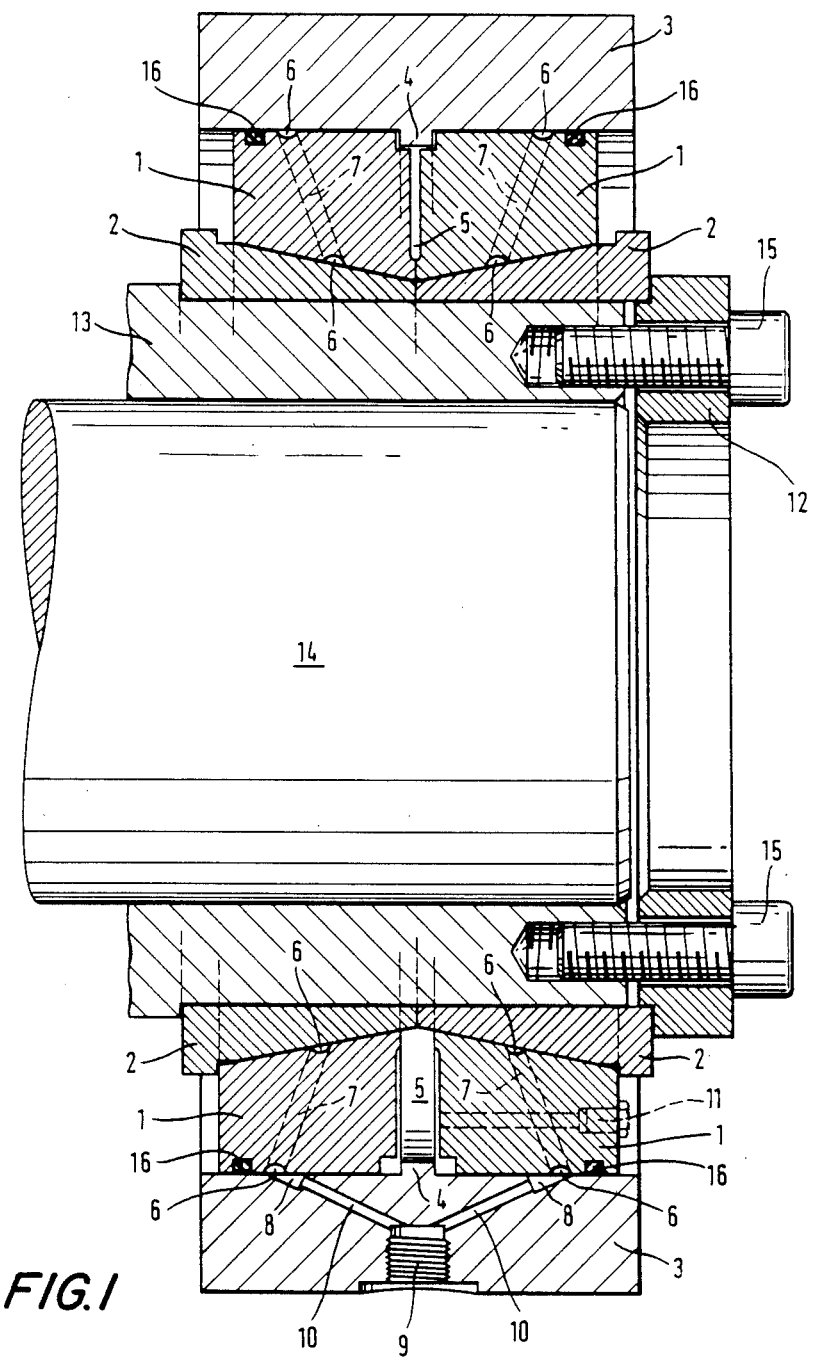
FIG. 1 of the drawings is a view showing a cross-section of a shrinking disc in accordance with the present invention.

As shown in FIG. 1 of the drawing in section, a shaft 14 is provided with a hub 13 which concentrically surrounds the shaft. The connection includes a shrinking disc which is shown in the upper part of the drawing in non-tensioned condition, and in the lower part of the drawing in a tensioned condition.

The cylindrical outer surface of the hub 13 is surrounded by an inner cylindrical inner ring 2 which is composed of two pieces. The inner ring 2 has a double conical outer surface. Two pressure rings 1 cooperate with the double conical surface of the inner ring 2 and is provided with inner peripheral surfaces which are correspondingly conical. The pressure rings 1 have a cylindrical outer surface and are guided in a cylindrical peripheral surface of a clamping ring 3. The clamping ring 3 surrounds both pressure rings 1.

The clamping ring 3 has a collar-shaped centering projection 4 which extends between the pressure rings 1 and limits a pressure chamber 5 from outside. The pressure rings 1 are provided with grooves which receive O-rings 16 as additional sealing elements for sealing the pressure chamber 5.

As can be seen at the lower half of the drawing, the clamping ring 3 is provided with a connecting opening 9 for admitting a pressure medium. A closure valve can be accommodated in the opening 9. The connecting opening 9 is subdivided inside the clamping ring 3 into two pressure medium channels 10 extending at an obtuse angle relative to one another and opening on the cylindrical inner peripheral surface of the clamping ring 3. Transitional regions 8 which expand the pressure medium channels 10 serve for easier arrangement of a drill during the manufacture which otherwise can be displaced. The inclined pressure medium channels 10 in the region of connection and transition to inclined pressure medium channels 7 in the pressure rings 1 have a length which corresponds to the displacing and clamping path of the pressure rings 1. The pressure medium channels 7 and the pressure rings 1 are formed at all ends as ring grooves 6.

When the pressure medium is supplied to the connecting opening 9, the flow of hydraulic fluid is distributed into the pressure medium channels 10 inside the clamping ring 3. Through these channels 10 the pressure medium flows between the cylindrical peripheral surfaces of the clamping ring 3 to the pressure rings 1 and then into the pressure medium channels 7 of the pressure rings 1, and then between the conical surfaces of the pressure rings 1 and the inner ring 2 to the pressure chamber 5 so as to act in the pressure chamber.

Under the action of the hydraulic pressure, the pressure rings 1 are pressed from their initial position shown in the upper part of the drawing, to the clamping position shown in the lower part of the drawing.

For releasing the shrinking disc, one of the pressure rings 1 is provided with an axial opening 11 with a valve 17. Through this opening 11 the pressure medium can escape so that the conical surfaces of the inner ring 2 and the pressure rings 1, located outside the region of self-locking, reach their non-clamped position, as shown in the upper half of the drawings. The release of the shrinking disc can be accelerated in that the pressure medium is supplied through the inlet opening 9. In other aspects the axial opening 11 is not absolutely necessary. The pressure medium can be released also through the inlet opening 9.

A small play is provided between the collar-shaped centering projection 4 and the pressure rings 1, for facilitating the throughflow of the pressure medium.

A cover 12 is arranged at the end of the hub 13. It is clamped by screws 15 with the hub 13, closes the hub 13 and forms an abutment for both pieces of the inner ring 2. The cover 12 counteracts a spreading of the inner ring 2 during tensioning of the pressure ring 1.

Figure 2:
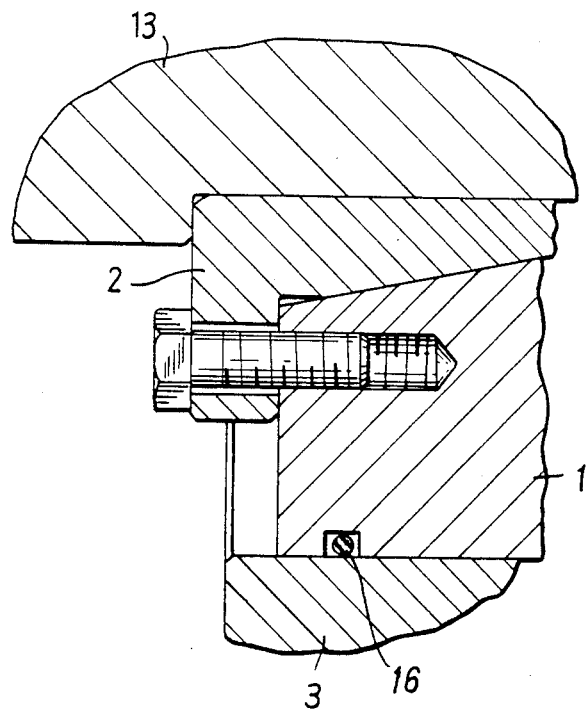
FIG. 2 is a view showing a fragment of FIG. 1 on an enlarged scale.

As can be seen from the drawings, the inner ring 2 has at its end a ring-shaped strip which prevents canting of the pressure ring 1. The ring-shaped strips with their increased outer diameter permit in a simple manner a mechanical arresting for the tensioned pressure ring 1, since axially extending holding screws can be screwed through these strips into threaded openings of the pressure ring 1 as shown in FIG. 2.

It will be understood that each of the elements described above, or two or more together, may also find a useful application in other types of constructions differing from the types described above.

While the invention has been illustrated and described as embodied in a hydraulically activated shrinking disc for force transmitting connection of the shaft with a hub, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A hydraulically actuatable shrinking disc, especially for a force transmitting connection of a hub having a cylindrical outer surface with a shaft, comprising an inner ring arranged to be located on a cylindrical outer surface of a hub and having a double-conical outer peripheral surface; two pressure rings which are arranged axially opposite to one another in a displaceable and clampable manner on said inner ring and have inner conical surfaces which corresponds to the outer peripheral surface of said inner ring, said pressure rings forming therebetween a pressure chamber for a pressure fluid, said pressure rings being mirror-symmetrical in their cross-section and each formed with a cylindrical outer peripheral surface, said pressure rings being provided with openings which serve as pressure medium passages; a clamping ring which serves as an abutment for said pressure rings and surrounds the latter, said clamping ring having an outer peripheral surface which is provided with a connecting opening for the pressure fluid and subdivided into two pressure medium passages which form an obtuse angle relative to a radial plane and extend inside said clamping ring so as to open at an inner peripheral surface of said clamping ring, said pressure medium passages of said pressure rings extend from an inner peripheral surface to said outer peripheral surface of said pressure rings and form relative to a radial plane an angle which is opposite to said angle between said pressure medium passages of said clamping ring, said pressure medium passages of said pressure rings having openings on said outer peripheral surface of said pressure rings and said pressure medium passages of said clamping ring having openings on said inner peripheral surface of said clamping ring so as to communicate with one another, and so that said pressure medium passages of said pressure rings supply the pressure fluid to said inner and outer peripheral surfaces of said pressure rings and through the latter into said pressure chamber.

2. A shrinking disc as defined in claim 1, wherein said openings of said pressure medium passages of said clamping ring have an axial length which in the region of a connection and transition to said pressure medium passages of said pressure rings corresponds to an axial displacement of said pressure rings.

3. A shrinking disc as defined in claim 1, wherein said angle between said pressure medium passages of said pressure rings is such that said openings on said cylindrical outer surface of each of said pressure rings is located closer to an outer end side of a respective one of said pressure rings than said pressure chamber, and said openings on said conical inner peripheral surface of each of said pressure rings are located closer to said pressure chamber.

4. A shrinking disc as defined in claim 1, wherein said openings of said pressure medium passages of said pressure rings are formed as ring grooves in said inner and outer peripheral surfaces of said pressure rings.

5. A shrinking disc as defined in claim 1; and further comprising sealing elements arranged in said pressure rings.

6. A shrinking disc as defined in claim 5, wherein said sealing elements are formed as O-rings arranged in said pressure rings.

7. A shrinking disc as defined in claim 1, wherein said clamping ring has an inner peripheral surface which is provided with a centering projecting formed as a collar.

8. A shrinking disc as defined in claim 1, wherein one of said pressing rings is provided with an axial opening for a pressure fluid, said axial opening having one end which opens into said pressure chamber and another end which is closeable.

9. A shrinking disc as defined in claim 8; and further comprising a valve which closes the other end of said axial opening of said pressure rings.

10. A shrinking disc as defined in claim 1; and further comprising means for arresting said pressure rings in their tensioned position against undesired release.

11. A shrinking disc as defined in claim 10, wherein said arresting means are formed as hydraulic arresting means.

12. A shrinking disc as defined in claim 10, wherein said arresting means are formed as pneumatic arresting means.

13. A shrinking disc as defined in claim 10, wherein said arresting means are formed as mechanical arresting means.

* * * * *